United States Patent [19]

Nishida et al.

[11] Patent Number: 4,877,534

[45] Date of Patent: Oct. 31, 1989

[54] ADSORBENT FOR REMOVING WATER- OR AIR-BORNE CONTAMINANTS

[75] Inventors: Konosuke Nishida, Kurita; Mitsue Hada, Ibaragi; Shozo Hiki, Kobe, all of Japan

[73] Assignees: Konosuke Nishida, Shiga; Mitsue Hada, Osaka; Hanshim Kikagaku Kabushiki Kaisha, Nishinomiya, all of Japan

[21] Appl. No.: 188,503

[22] Filed: Apr. 29, 1988

[30] Foreign Application Priority Data

Oct. 14, 1987 [JP] Japan ............................ 62-260463

[51] Int. Cl.$^4$ .......................................... B01D 15/04
[52] U.S. Cl. ................................. 210/691; 210/694; 210/502.1; 55/74; 55/387
[58] Field of Search ................ 55/74, 84, 73, 387, 55/512, 486, 323, 522; 210/694, 691, 502.1; 502/7, 401

[56] References Cited

U.S. PATENT DOCUMENTS

| 2,043,298 | 6/1936 | Markels | 55/512 |
| 4,161,426 | 7/1979 | Kneer | 55/74 |
| 4,337,276 | 6/1982 | Nakamura | 55/387 |
| 4,645,605 | 2/1987 | Durham | 55/387 |
| 4,662,900 | 5/1987 | Ottengraf | 55/90 |
| 4,676,907 | 6/1987 | Harrison | 210/512.1 |

FOREIGN PATENT DOCUMENTS

| 71372 | 6/1977 | Japan | 55/387 |
| 26512 | 9/1979 | Japan | 55/387 |

Primary Examiner—Bernard Nozick
Attorney, Agent, or Firm—Armstrong, Nikaido, Marmelstein, Kubovcik & Murray

[57] ABSTRACT

An adsorbent mainly comprises a mixture of a carbonized material and a soil either as it is or in the shaped or granulated form. The adsorbent is utilized for removing various contaminants occurring in water and air.

10 Claims, 3 Drawing Sheets

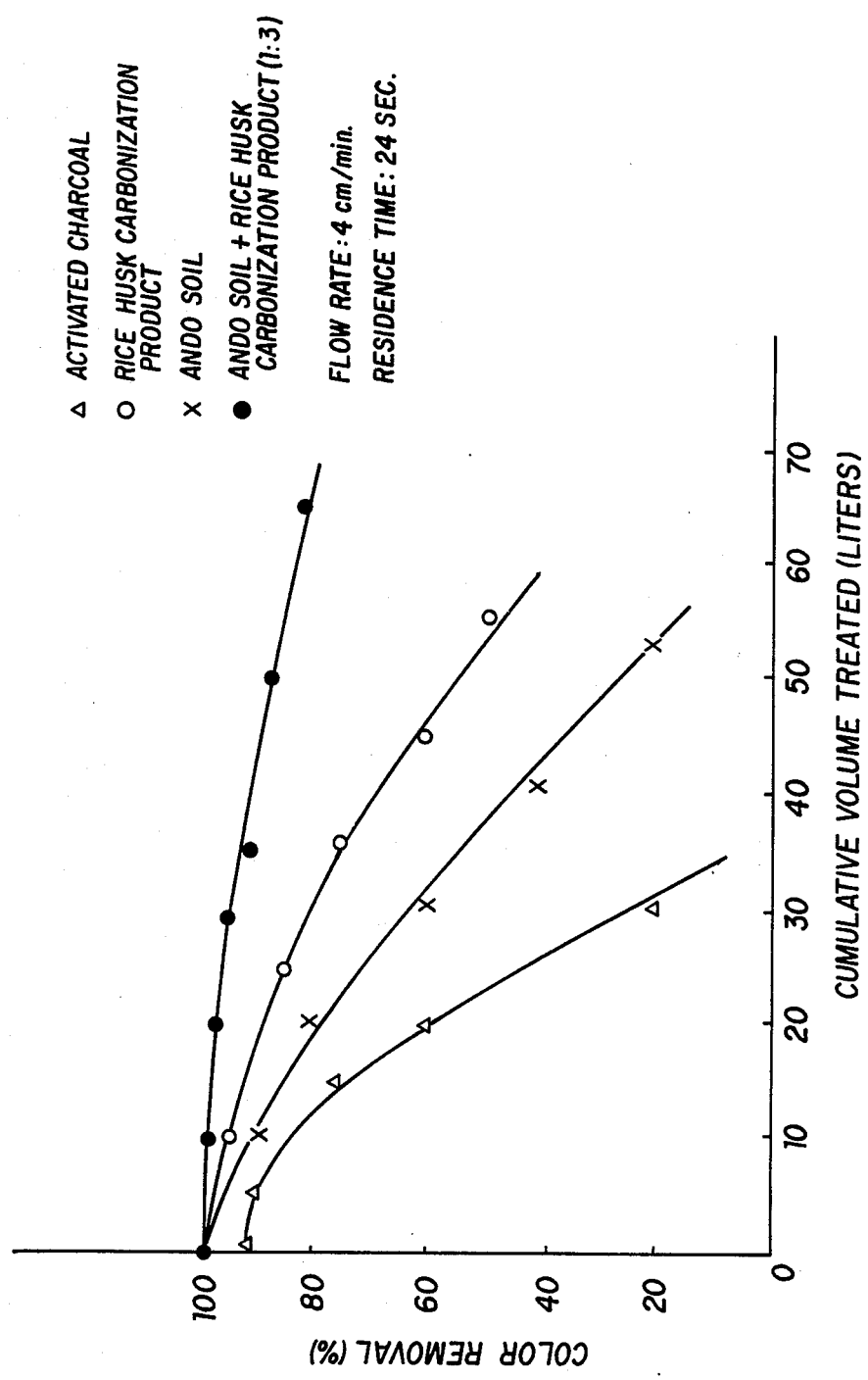

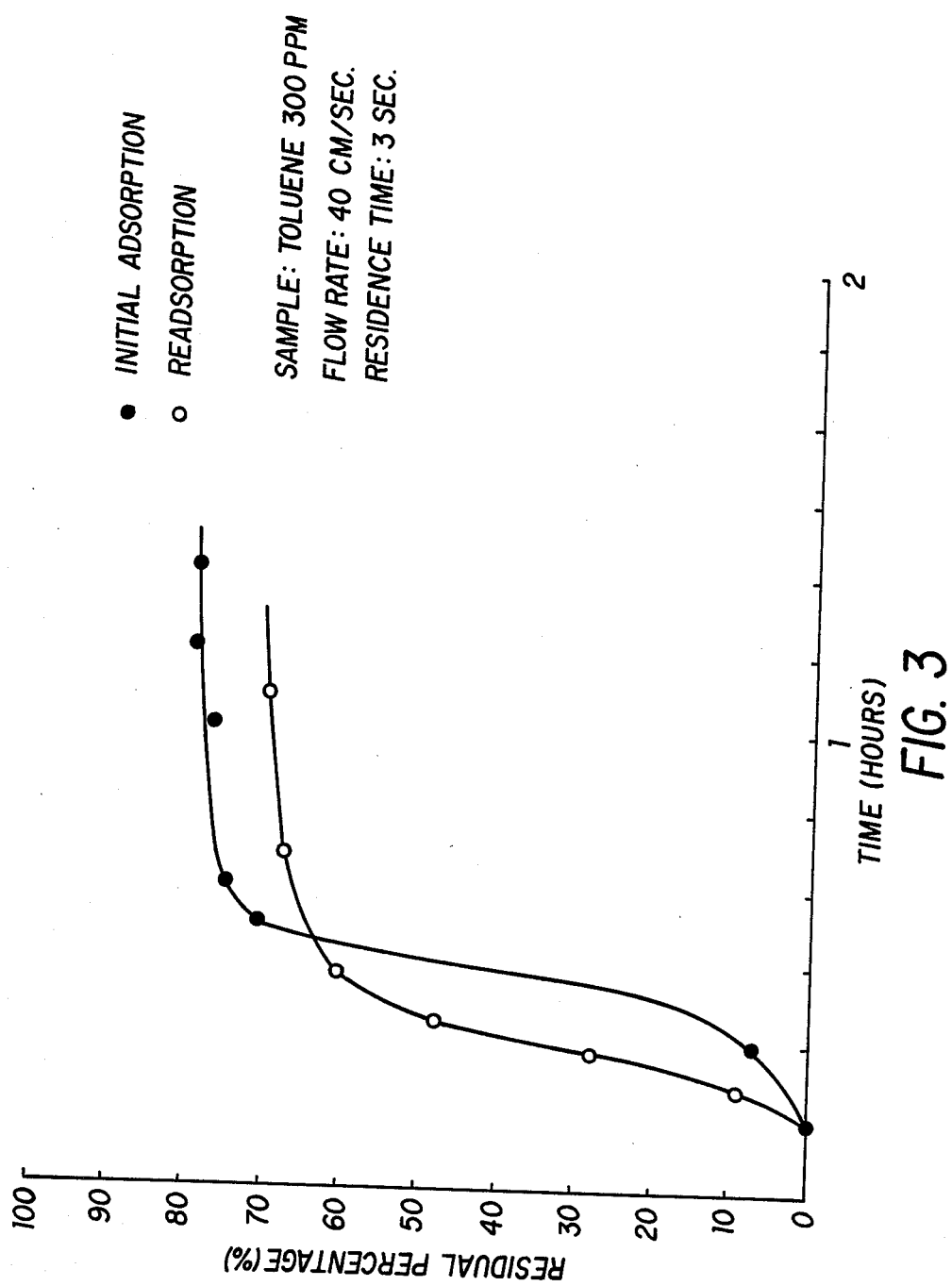

ADSORBENT FOR REMOVING WATER- OR AIR-BORNE CONTAMINANTS

BACKGROUND OF THE INVENTION

1. Field of the Invention

This invention relates to an adsorbent mainly comprising a mixture of a carbonized material and a soil either as it is or in a shaped or granulated form and to a method of removing various contaminants occurring in water and air using the adsorbent.

2. Prior Art

Solid adsorbents such as activated charcoal have been widely used so far for the removal of toxic substances and trace contaminants occurring in water and air. However, such adsorbents each have a very strong selectivity with respect to substances adsorbable thereon. Therefore, it is very difficult to efficiently remove all contaminants from actual water or air which usually occurs as a complex pollution system in which a number of substances much differing in chemical characteristics coexist. In the case of activated charcoal, for instance, which is used most generally, the adsorbency for alkaline substances, such as ammonia and amines, and for colored substances, such as dye particles, is very weak and, in many instances, the contaminant concentration in water or air after passage through an activated charcoal-containing filtration layer differs little from the concentration before entering said filtration layer. In the activated charcoal method, when the contaminant and turbidity component fraction in water or air to be treated changes in composition, as substances having a higher affinity for activated charcoal than the substances adsorbed earlier on the surface of activated charcoal enter the layer, the phenomenon of replacement of the already adsorbed substances by the late comer contaminants takes place on the activated charcoal surface with ease. Thus, the new comer contaminants cause abrupt release, from the activated charcoal surface and from the system, of large amounts of contaminants already adsorbed and accumulated on the activated charcoal surface. Transitory but abrupt contaminant release due to such phenomenon causes very high concentration contamination as compared with the concentrations in water or air to be treated. Such high concentration recontamination is encountered frequently in actual adsorption plants using activated charcoal and offers a serious problem.

Furthermore, the mechanisms of trapping target components on known solid adsorbents such as activated charcoal always consist in adsorption of substances on the adsorbent surface and adsorption of substances on the adsorbent micropore inside surface. Therefore, once those surfaces have been covered with contaminants and coexisting substances, the adsorbing power rapidly decreases or is lost. While the time until such decrease in adsorbing power takes place depends on the characteristics and concentrations of target substances, said time is generally very short with samples from actual working sites, namely as short as $\frac{1}{3}$ to 1/5 of the nominal value given by manufacturers. This is due to the above-mentioned simultaneous adsorption of coexisting substances. Upon such saturation of an adsorbent in respect to adsorption, it becomes necessary to immediately replace it with a fresh adsorbent. However, since the adsorbents in practical use are usually very expensive and the replacing work is laborious, such adsorbents are generally used continuously even after saturation in respect to adsorption without exchange until the lapse of a period indicated by manufacturers. However, the value indicated by manufacturers is based on the value measured in laboratories using specific substances possibly occurring in water or air to be treated without taking into consideration the possible effects of coexisting substances. As a result, the life of an adsorbent in the treatment of a complex system in an actual plant is much lower than the value given by the relevant manufacture.

As mentioned above, the solid adsorbents currently in use, such as activated charcoal, are quite powerless in many instances in adsorptively purifying actual foul water or contaminated air in which substances differing in chemical characteristics such as polarity coexist. In many cases, activated charcoal adsorbent layers become concentration layers. Such situation shows that frequent adsorbent exchange is inevitable in the conventional methods. In view of the above, development of a more effective adsorbent capable of trapping a broad range of substance groups with large adsorption or trapping capacity as well as marked prolongation of the adsorbent life in practical use or development of an adsorbent capable of self-regenerating or self-restoring the adsorption capacity thereof is waited for.

SUMMARY OF THE INVENTION

The present invention provides means of depriving various kinds of industrial waste water, other kinds of dirty or waste water, and effluents from treatment facilities therefor of pollutants and coloring substances contained or remaining therein, depriving river/watercourse or lake/marsh water contaminated, polluted or rendered eutrophic with or by various substances inclusive of coloring substances and odoriferous substances, depriving tap water of odoriferous substances (e.g. diosmin and 2-methylisoborneol) and organochlorine compounds (e.g. trihalomethanes) existing therein, depriving swimming pool water of toxic organochlorine compounds (e.g. chloramines) and turbidity-causing substances existing therein and depriving contaminated air of various pollutants such as sulfur oxides, nitrogen oxides, chlorine compounds, hydrocarbons and oxidation products derived therefrom as well as various odoriferous substances occurring therein, said means comprising the use of a mixture of a carbonized material and a soil such as ando soil and purifying and/or improving the quality of such water or cleaning and/or deodorizing such air by taking up and holding and/or degradatively removing toxic substances, contaminants and turbiditycausing substances occurring therein efficiently and economically and in a short period of time.

Thus, the kind of the soil to be admixed with the carbonized material and the mixing ratio are selected based on the characteristics, compositions, quantities and conditions of occurrence of toxic substances, other pollutants and turbidity-causing substances, and the mixture prepared according to such selection is filled or put into a container suited for the place and/or conditions of application of said mixture, either as it is or after conversion to the form of a shaped article or granules. Then, the target water, air or gas to be purified is passed through the layer containing the carbonized material-soil mixture under appropriate conditions, whereby the toxic substances, pollutants and turbidity-causing substances contained in said target are efficiently removed.

In the case of application to courses of various kinds of foul water or waste water or to rivers or agricultural waterways, the carbonized material-soil mixture in appropriate vessels is fixedly disposed on an overflow dam in the course of contaminated water to be treated or on the bottom floor or side where such water flows. The water to be treated is caused to flow down or overflow through said mixture at a certain appropriate rate of flow, whereby contaminants and turbidity components in said water are removed and water purification is attained.

The term "carbonized material" as used herein typically includes rice husk carbonization products, which are produced by smoking or smoldering of rice husks and have long been used in the field of agriculture for soil improvement, in rice nurseries and as a covering material for use on the occasion of germination. Until recently, such products mostly were home-made ones. As a result of the recent spread of country elevators, mass threshing is currently carried out in a centralized manner and large quantities of rice husks formed thereby are used for making carbonized materials by smoldering in incinerators or continuous furnaces.

In accordance with the invention, the same functions and effects can be expected also from the use of dry distillation or carbonization products derived from vegetable materials such as wood chips, chips from lumber from thinning, sawdust, plant barks and leaves, or briefly "charcoal" or "cinders". Therefore, it is to be noted that the term "carbonized material" also includes such materials as mentioned above in addition to rice husk carbonization products.

Thus, one feature of the invention lies in the ability of carbonization or dry distillation products derived from vegetable materials to adsorb contaminants and pollutants. A second feature is that these materials still contain organic substances in large amounts because the degree of carbonization is not so high in said materials. Said organic substances can serve as nutrient sources for the growth of microorganisms and, therefore, when said materials are used as purifying agents, two processes, namely adsorption of contaminants by organic carbon and degradation of adsorbates by growing microorganisms, progress in parallel. The above two characteristic features allow the purifying function to be maintained for a prolonged period of time. On the contrary, the texture of activated charcoal is mostly constituted by carbon alone because of very advanced carbonization due to high temperature dry distillation, although the material is also derived from plants (wood, coconut shells, etc.) by carbonization as in the case of the present invention. The carbonized materials to be used in accordance with the invention are produced by carbonization at relatively low temperatures, so that organic substances and the like remain therein in large amounts. In this respect, they differ greatly from activated charcoal.

Ando soil is a volcanic ash (or puzzolan) soil. Ando soil alone is already in use for the purpose of deodorization. However, it is by the present invention that the combined use of ando soil with a carbonized material is proposed for the first time.

In addition to ando soil, loamy soils may possibly be used with substantially equal effects to those of ando soil. Other soil species are generally poor in permeability to air and water as compared with ando soil. Permeation of air and water is advantageous to the growth of microorganisms in soil layers.

The mixing ratio between ando soil and the carbonized material should be varied such that when inorganic substances are prevailing among contaminants to be removed, the adsorbency of the carbonized material is mainly made use of while the contaminant fraction is rich in organic substances, degradation by microorganisms is caused to take place more actively by the use of ando soil in an increased amount. The mixing ratio is to be selected based on the results of a preliminary experiment or experiments using the foul water or exhaust gas or the like to be treated. On that occasion, the time during which the mixture layer can be used for one adsorption run, the interval for adsorbent layer exchange, and the time required for degradation of substances trapped in the layer, which means the ability of the adsorbency of the ando soil-carbonized material system to be self-regenerated, are to be determined simultaneously. When the volume of the foul water or exhaust gas or the like to be treated is very large, the vessel to be filled with an ando soil-carbonized material mixture may become very great if said mixture is used as it is. In addition, when the particle size is small, the resistance to air or water permeation in the filled vessel will become great. In such a case, it is necessary to granulate the mixture to a grain size of 1–3 cm. Such granulation or shaping makes it possible to treat a large volume of foul water or waste atmosphere in a short period of time and, furthermore, markedly reduce the energy cost for feeding water or air.

In the embodiments described later herein, the mixing ratio between ando soil and carbonized material is 1:3 or 1:4 by volume. This ratio is an optimum value determined as a result of investigations with each treatment target; at said value, a maximum contaminant elimination effect is producible. In each actual practical use, the mixing ratio should be selected depending on the contaminant components and quantities thereof in the foul water or exhaust air to be treated.

The adsorbent according to the present invention is characterized in that organic and/or inorganic contaminants, turbidity components, colored or coloring substances, odoriferous substances and trace amounts of scarcely degradable substances in water or air are trapped by the carbonized material and ando soil, the mechanisms of trapping involving not only mere physical adsorption but also simultaneous progress of irreversible adsorption due to chemical reaction with various organic and inorganic substances contained in the carbonized material and soil, and in that substances once trapped in the soil-carbonized material layer are degraded, consumed and rendered nontoxic by various groups of microorganisms living and multiplying in the soil layer.

Thus, one characteristic feature of the adsorbent according to the invention lies in the ability of carbonization or dry distillation products derived from vegetable materials to adsorb contaminants and pollutants. Another feature is that these materials still contain organic substances in large amounts because the degree of carbonization is not so high in said materials. Said organic substances can serve as nutrient sources for the growth of microorganisms and, therefore, when said materials are used as purifying agents, the process of adsorption of contaminants by organic carbon and the process of degradation of adsorbates by growing microorganisms progress in parallel. The above two characteristic features allow the purifying function to be maintained for a prolonged period of time. On the contrary, the texture of activated charcoal is mostly constituted by carbon alone because of very advanced carbonization due to high temperature dry distillation, although activated charcoal is also derived from plants (wood, coconut shells, etc.) by carbonization as in the case of the invention. The carbonized materials to be used according to the invention are produced by carbonization at relatively low temperatures, so that organic substances and the like remain therein in large amounts. In this respect, they differ greatly from activated charcoal.

BRIEF DESCRIPTION OF THE DRAWINGS

FIG. 2 shows a graph obtained by plotting the percent color removal versus the cumulative feed volume of a dyeing plant waste water.

FIG. 3 shows a graph obtained by plotting the residual contaminant percentage versus the time.

DESCRIPTION OF THE PREFERRED EMBODIMENTS

Figure 1:
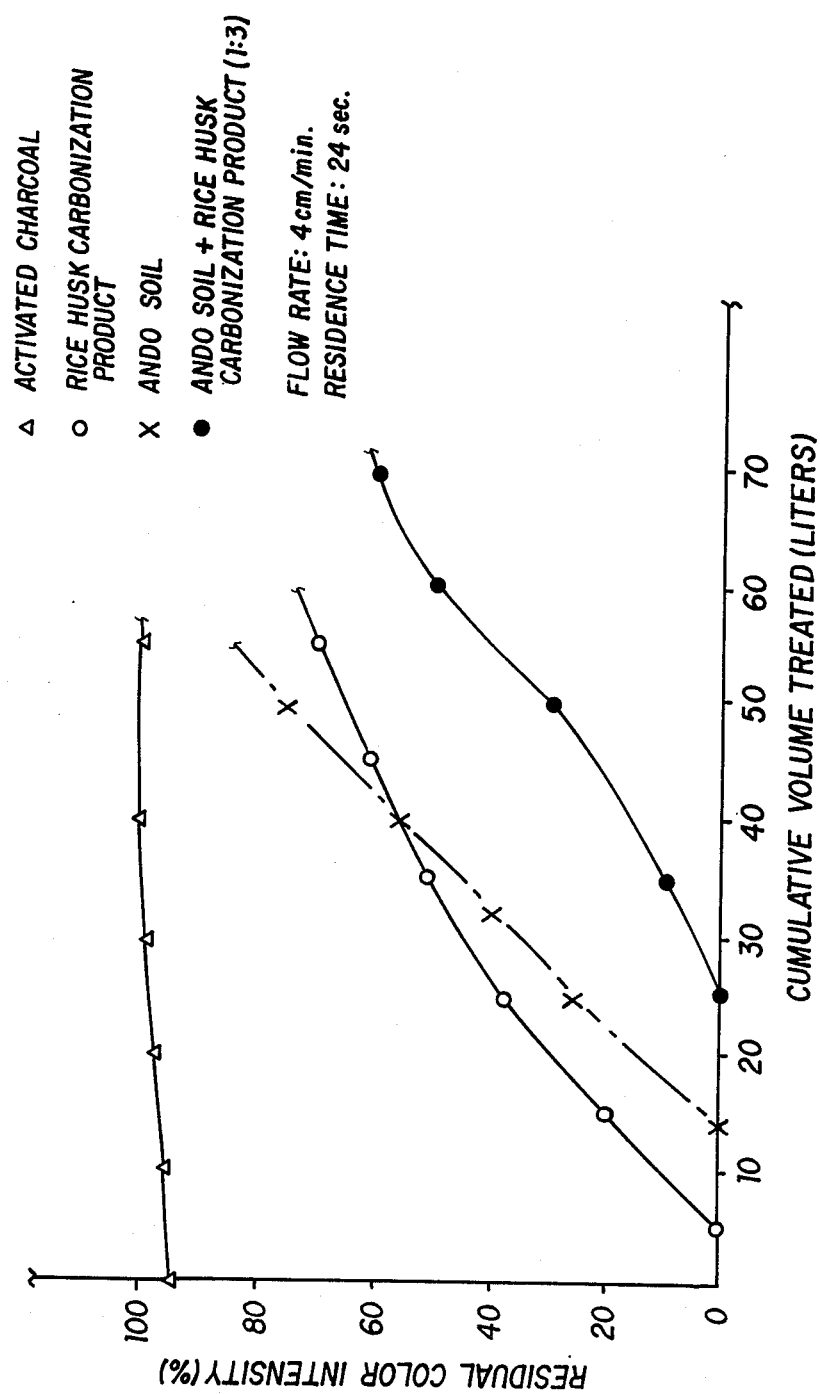
FIG. 1 shows a graph obtained by plotting the percent residual color intensity versus the cumulative feed volume of a methylene blue solution.

FIG. 1 shows the results of measurements made to demonstrate the effect of the present invention on a laboratory scale. Thus, there are shown, by way of example, the results of the use of an adsorbent according to the invention in decolorizing a sample of colored water as prepared by dissolving methylene blue as the coloring agent in distilled water (1/50,000 solution), said results being given in terms of absorbance. A mixture of a rice husk carbonization product and ando soil in a volume ratio of 3:1 was used as the color adsorbent and was packed in a column. The above-mentioned colored water was passed through the column at a flow rate of 4 cm/min. The degree of coloration was measured at the inlet and outlet of the column. The figure also show the results of measurements made for comparison under the same conditions using activated charcoal, the rice husk carbonization product and ando soil each individually as the adsorbent. As is evident from the figure, activated charcoal is quite incapable of adsorbing methylene blue. While the rice husk carbonization product and ando soil each shows good adsorbency, the use of the mixed adsorbent composed of both results in an increase in the efficiency of methylene blue elimination by 30-50% as compared with the single use of each respective component and also results in a 1.5- to 2-fold prolongation of the life of the adsorbent in continuous use, thus being very advantageous in actual discoloration of contaminated water or waste water. These results suggest that the addition of a soil to a rice husk carbonization product can lead to gradual and successive degradation of substances adsorbed on the rice husk carbonization product by the action of soil microorganisms, hence to simultaneous renewal of the adsorbent surface.

FIG. 2 shows the results of application of the present invention to a case where a great problem had been encountered on the side of a river receiving effluents from waste water treatment facilities in a real dyeing plant because of residual coloration of said effluents. In the figure, there are also shown the results obtained by the single use of activated charcoal, ando soil or a rice husk carbonization product. It is clear that activated charcoal is quite incapable of discolorizing the dyeing plant waste water. On the other hand, it is seen that while the ando soil and rice husk carbonization product show a considerable decolorizing effect even when they are used individually, the mixture of both, namly the mixture of ando soil and rice husk carbonization product in a volume ratio of 1:3, when used as adsorbent, shows a markedly increased decolorizing effect as compared with each component used singly and furthermore has a very much improved or prolonged (approximately doubled) life as adsorbent. From the economical viewpoint, the above facts are very beneficial for practical use of the mixed adsorbent. The results shown indicate that the rice husk carbonization product-ando soil combination has a broad selective-adsorption spectrum and that degradation of trapped substances by soil microorganisms proceeds simultaneously in the adsorption system. The originality and epoch-making feature of the invention lie in these facts.

FIG. 3 shows the results obtained by applying the present invention to the purification of air contaminated by an organic solvent, said results clearly indicating that the adsorbent according to the invention has a mechanism for self-regeneration of its adsorptive character, which is one of the important features of the invention. In this example, the extent of self-regeneration of the adsorbency of an adsorption layer packed with an ando soil-rice husk carbonization product mixture (1:4 in volume ratio) was measured. Thus, contaminated air (300 ppm toluene) was passed through the adsorbent layer continuously and the toluene concentrations at the inlet and outlet of the adsorbent layer were measured. The initial adsorption plot shown in the figure is the break-through curve constructed on the basis of toluene concentration data thus obtained. When the adsorbent layer had reached a state of saturation, the passage of contaminated air was discontinued. The adsorbent layer (packed column) was stored at room temperature under anaerobic or aerobic conditions for about 20 days. Then, air contaminated with 300 ppm of toluene was again passed through said packed layer and a break-through curve was constructed based on the toluene removal rate data obtained. This is the readsorption plot shown in the figure.

As the results shown indicate, it is an outstanding feature of the adsorbent according to the invention that its adsorbency can be restored almost completely upon mere lapse of a certain period of time after its once having reached saturation. Such function can never be expected from the conventional adsorption method using activated charcoal. When, in the activated charcoal method, the adsorbent activated charcoal has reached saturation in respect to adsorption, it must be taken out of the packing vessel and exchanged for a fresh portion of activated charcoal. Although the saturated charcoal can be regenerated by activation treatment under high temperature and high pressure conditions, the regeneration cost is high and a complicated installation is required. Therefore, the saturated charcoal is generally discarded and, as a result, the treatment cost becomes very high; this is the greatest disadvantage of the activated charcoal method. On the contrary, the adsorbent according to the invention simultaneously has the ability to degrade substances adsorbed thereon, hence does not require, such elaborate regeneration treatment or frequent exchange as in the case of activated charcoal. The adsorbent according to the invention thus functions in an epoch-making manner, namely highly efficiently, in actual removal of contaminants and pollutants. As regards the economic feature in practical use, it is greatly advantageous as compared with the prior art adsorbents.

As stated hereinabove, the present invention consists in using as the adsorbent a mixture composed of a carbonized material and a soil such as ando soil in proportions selected depending on the characteristics or compositions of contaminants or pollutants in contaminated water or air to be treated, to thereby cause said adsorbent to perform the contaminant-removing functions of both the components simultaneously so that water or air can be successfully treated or purified. The invention is characterized by the facts or findings that smoking, dry distillation or carbonization products derived from plant seed coats or barks, such as rice husk carbonization products, are exceptionally capable of adsorbing and retaining a broad range of inorganic and organic substances without showing such high selectivity for substances adsorbable thereon as shown by activated charcoal, that soils such as ando soil have high buffer activity and soil components are also capable of removing contaminants or pollutants by physico-chemical adsorption and, furthermore, that microorganisms occurring and living in soils are capable of concurrently biodegrading trapped substances, making them nontoxic. In addition, carbonized materials contain large quantities of nutrient sources necessary for the growth of soil microorganisms and therefore processes for the multiplication of said microorganisms proceed actively in parallel with contaminant removal. As a result, self-regeneration of the adsorbency of the carbonized materials and/or soils can be attained in a relatively short period of time, and the adsorbent life can be extended to several years or, in extreme cases, to ten and odd years.

What is claimed is:

1. A method for removing contaminants from air or water, comprising:
    passing a fluid to be treated through an adsorbent mainly comprising a mixture of at least one soil selected from the group consisting of Ando soil and loamy soil, and carbonized plant material containing amounts of organic substances sufficient to serve as nutrient sources for the growth of microorganisms that degrade the contaminants.

2. The method of claim 1, wherein said carbonized material is a product of carbonization of rice husks.

3. The method of claim 1, wherein the volume ratio between the carbonized material and the soil is about 3:1.

4. The method of claim 1, wherein the volume ratio between the carbonized material and the soil is about 4:1.

5. A self-regenerating adsorbent mixture for removing contaminants from air or water, comprising:
    at least one soil selected from the group consisting of Ando soil and loamy soil; and
    carbonized plant material containing amounts of organic substances sufficient to serve as nutrient sources for the growth of microorganisms that degrade the contaminants.

6. The adsorbent of claim 5, wherein said carbonized material is a product of carbonization of rice husks.

7. The adsorbent of claim 5 which has the form of a shaped article derived from said mixture.

8. The adsorbent of claim 5 which has the form of a granulation product derived from said mixture.

9. The adsorbent of claim 5, wherein the volume ratio between the carbonized material and the soil is about 3:1.

10. The adsorbent of claim 5, wherein the volume ratio between the carbonized material and the soil is about 4:1.

* * * * *

UNITED STATES PATENT AND TRADEMARK OFFICE
CERTIFICATE OF CORRECTION

PATENT NO. : 4,877,534

DATED : October 31, 1989

INVENTOR(S) : NISHIDA et al

It is certified that error appears in the above-identified patent and that said Letters Patent is hereby corrected as shown below:

On the cover page, Item [73] line 2, "Hanshim" should read

--Hanshin--.

Signed and Sealed this

Twenty-seventh Day of November, 1990

Attest:

HARRY F. MANBECK, JR.

*Attesting Officer*  *Commissioner of Patents and Trademarks*